United States Patent
Benighaus et al.

(10) Patent No.: US 9,481,780 B2
(45) Date of Patent: Nov. 1, 2016

(54) THERMOPLASTIC MOLDING COMPOUNDS

(71) Applicant: LANXESS Deutschland GmbH, Cologne (DE)

(72) Inventors: Tobias Benighaus, Duesseldorf (DE); Detlev Joachimi, Krefeld (DE); Guenter Margraf, Dormagen (DE); Christian Ruthard, Mainz (DE); Holger Schmidt, Dormagen (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 14/386,412

(22) PCT Filed: Mar. 18, 2013

(86) PCT No.: PCT/EP2013/055579
§ 371 (c)(1),
(2) Date: Sep. 19, 2014

(87) PCT Pub. No.: WO2013/139743
PCT Pub. Date: Sep. 26, 2013

(65) Prior Publication Data
US 2015/0057410 A1 Feb. 26, 2015

(30) Foreign Application Priority Data
Mar. 21, 2012 (EP) .................................... 12160534

(51) Int. Cl.
C08K 3/24 (2006.01)
C08K 5/09 (2006.01)
C08K 5/098 (2006.01)
C08L 77/02 (2006.01)

(52) U.S. Cl.
CPC . *C08K 3/24* (2013.01); *C08K 5/09* (2013.01); *C08K 5/098* (2013.01); *C08L 77/02* (2013.01)

(58) Field of Classification Search
CPC .......... C08L 77/02; C08K 5/09; C08K 5/098; C08K 3/24
See application file for complete search history.

(56) References Cited

U.S. PATENT DOCUMENTS

| 4,079,033 A | * | 3/1978 | Oswitch et al. .............. 524/398 |
| 4,347,175 A | | 8/1982 | Shustova et al. |
| 4,438,223 A | | 3/1984 | Hunter |
| 4,757,099 A | * | 7/1988 | Hoshino .................. A61L 9/01 106/170.41 |
| 5,071,894 A | * | 12/1991 | Weil et al. .................... 524/127 |
| 5,965,652 A | | 10/1999 | El Sayed et al. |

FOREIGN PATENT DOCUMENTS

| DE | 102008052055 A1 | 4/2010 |
| DE | 102008053797 A1 | 5/2010 |
| JP | 62-086052 | * 4/1987 |

OTHER PUBLICATIONS

Spectrum, Ferrous Oxalate MSDS, 2006, p. 1-6.*
Zweifel, Plastics Additives Handbook, 2001, Basic Antioxidant Mechanisms, Carl Hanser Verlag, Munich, Germany pp. 10-19.
Zweifel, Plastics Additives Handbook, 2001, Stabilization of Selected Substrates, Carl Hanser Verlag, Munich, Germany pp. 40-93.
Zweifel, Plastics Additives Handbook, 2001, Stabilization of Selected Substrates, Carl Hanser Verlag, Munich, Germany pp. 80-85, 546-547, 688-689, 872-875, 938-939, 966-967.
International Search Report from International Application No. PCT/EP2013/055579 dated Aug. 5, 2013, 2 pages.

* cited by examiner

*Primary Examiner* — Robert Jones, Jr.

(57) ABSTRACT

The present invention relates to thermoplastic molding compositions comprising iron oxalate as stabilizer system with respect to adverse thermooxidative effects. The invention further relates to the use of iron oxalate to improve the stability of thermoplastic molding compositions with respect to adverse thermooxidative and/or photooxidative effects, and also to processes for the production of the said molding compositions.

11 Claims, No Drawings

THERMOPLASTIC MOLDING COMPOUNDS

The present invention relates to thermoplastic moulding compositions comprising iron oxalate as stabilizer with respect to adverse thermooxidative effects. The invention further relates to the use of this stabilizer to improve the stability of thermoplastic moulding compositions with respect to adverse thermooxidative and/or photooxidative effects, and also to processes for the production of the said moulding compositions.

Thermoplastic polymers, preferably polyamides or polyesters, in particular semicrystalline polyamides or polyesters, are often used as materials for mouldings which during their lifetime have exposure to elevated temperatures for a prolonged period. For a wide variety of applications here, in particular for applications in the engine compartment of vehicles, a requirement is that the materials have sufficient stability with respect to the adverse thermooxidative effects that arise under these conditions.

Thermoplastic moulding compositions generally exhibit impairment of their mechanical properties when they are exposed to elevated temperatures for a prolonged period. This effect derives mainly from adverse oxidative effects on the polymers at elevated temperatures (adverse thermooxidative effects). For the purposes of the present invention, the expression "a prolonged period" means more than 100 hours, and for the purposes of the present invention the expression "elevated temperatures" means temperatures higher than 80° C.

The stability of thermoplastic moulding compositions with respect to adverse thermooxidative effects is usually assessed via comparison of mechanical properties, in particular of impact resistance, of tensile stress at break and tensile strain at break measured in the ISO 527 tensile test, and also of the modulus of elasticity, at a defined temperature over a defined period.

Numerous systems for the stabilization of thermoplastic polymers, also termed thermoplastics, with respect to adverse thermooxidative effects and to the resultant molecular degradation are known and have been described in the literature. A summary is found in "Plastic Additives Handbook" (5th Edition, edited by: Hans Zweifel, Carl Hanser Verlag, Munich, 2001) on pages 10 to 19 and 40 to 92. In engineering thermoplastics, in particular polyamides, it is usual to use antioxidants based on sterically hindered phenols or based on aromatic amines, as organic stabilizers, or systems based on copper compounds, as inorganic stabilizers. The organic stabilizers mentioned are generally used for temperatures up to about 120° C., and some are also still effective at high temperatures.

Effective stabilization at higher temperatures up to about 140° C. is usually achieved via stabilizer systems based on mixtures of copper halides and alkali metal halides.

In recent years there has been a marked rise in the requirements placed upon the service temperatures at which thermoplastic polymers, such as polyamides, retain sufficient stability. Many applications demand longer-term thermal stabilization with respect to thermooxidative degradation at 160° C. or even from 180 to 200° C.

DE-4305166 A1 describes an improvement of copper-based thermal stabilization systems via addition of strong reducing agents which leads to in-situ formation of finely divided elemental copper. DE-4305166 A1 also reveals that colloidal, elemental copper which is not produced in-situ has markedly less activity in respect of thermal stabilization.

U.S. Pat. No. 4,347,175 describes a process for the stabilization of polymers via mixing of the polymers with formates of multivalent metals and heating of the mixture to a temperature above the decomposition temperature of the formates of the multivalent metals.

In general, stabilizing systems can only delay, rather than prevent, the thermooxidative degradation of thermoplastic moulding compositions at elevated temperatures over a prolonged period. The requirements placed upon thermoplastic moulding compositions or upon mouldings to be produced therefrom in high-temperature applications are not yet sufficiently met by the systems known from the prior art: by way of example, long-term ageing in case of storage after ~1000 hours at from 180 to 200° C. causes a very marked reduction of impact resistance or tensile stress at break, mostly to less than 50% of the initial value.

It is therefore an object of the present invention to provide a stabilizer system and thermoplastic moulding compositions comprising this stabilizer system, and thus to permit a further marked improvement of stabilization with respect to adverse thermooxidative effects when comparison is made with the systems known from the prior art.

Surprisingly, it has now been found that a marked improvement of the stability of thermoplastics, mouldings to be produced therefrom, with respect to adverse thermooxidative effects can be achieved with iron oxalate.

The object is achieved by, and the present invention therefore provides, the use of iron oxalate for the stabilization of thermoplastic polymers, or of moulding compositions based on thermoplastic polymers, and of fibres, foils or mouldings to be produced therefrom, with respect to adverse thermooxidative effects and/or with respect to adverse photooxidative effects.

For clarity, it should be noted that the scope of the invention comprises any desired combinations of all of the definitions and parameters mentioned in general terms or in preferred ranges below.

The present invention therefore also provides thermoplastic moulding compositions comprising
(1) from 10 to 99.85% by weight of a thermoplastic polymer or a combination of different thermoplastic polymers,
(2) from 0.05 to 10% by weight of iron oxalate, and
(3) from 0.1 to 70% by weight of other ingredients, where the total of the percentages by weight is always 100% by weight.

In one preferred embodiment, the thermoplastic moulding compositions according to the invention also comprise, in addition to components (1) to (3), (4) from 5 to 70% by weight of fillers or reinforcing materials, preferably glass fibres or carbon fibres, particularly preferably glass fibres, where the proportions of components (1) to (3) are reduced in such a way that the total of all of the percentages by weight is 100.

According to the invention, preference is given to thermoplastic moulding compositions comprising
(1) from 10 to 99.75% by weight of a thermoplastic polymer or a combination of different thermoplastic polymers,
(2) from 0.05 to 8% by weight, preferably from 0.1 to 5% by weight, particularly preferably from 0.2 to 3% by weight of iron oxalate, and
(3) from 0.1 to 70% by weight of other ingredients, where the total of the percentages by weight is always 100% by weight.

The present invention further provides the use of the thermoplastic moulding compositions according to the invention for the production of fibres, foils or mouldings of any type.

However, the present invention also provides a process for the thermal stabilization of thermoplastic polymers and of fibres, foils or mouldings to be produced therefrom, by using a stabilizer system comprising at least iron oxalate.

However, the present application also provides a process for the mitigation on all adverse photooxidative and/or thermooxidative effects on thermoplastic polymers, or on foils, fibres or mouldings to be produced therefrom, by adding at least iron oxalate.

The thermoplastic polymers to he used as component (1) are preferably amorphous polymers. thermoplastic elastomers or semicrystalline polymers. It is particularly preferable to use the stabilizer system according to the invention for polymers which are used in high-temperature applications, and it is very particularly preferable to use the stabilizer system according to the invention in semicrystalline polymers having a melting point of at least 180° C. or in amorphous polymers having a glass transition temperature of at least 150° C.

Particularly preferred amorphous polymers to be used as component (1) are amorphous polyamides, amorphous polyimides, amorphous polyetherimides, amorphous polysulphones or amorphous polyacrylates.

Particularly preferred semicrystalline polymers to be used as component (1) are semicrystalline polyphenylene sulphides, semicrystalline polyesters, semicrystalline polyether ketones or semicrystalline polyamides, in particular semicrystalline polyesters or semicrystalline polyamides, particular preference being given more particularly to semicrystalline polyamides.

In one preferred embodiment, a blend of different thermoplastic polymers is also used as component (1).

Very particular preference is more particularly given to using aliphatic or semiaromatic polyamide as component (1), i.e. as semicrystalline polyamide, and particularly to using nylon-6 or nylon-6,6 with relative solution viscosities in m-cresol of from 2.0 to 4.0, and very particular preference is more particularly given to using nylon-6 with a relative solution viscosity in m-cresol of from 2.3 to 3.2.

In methods for the determination of relative solution viscosity, the flow times of a polymer solution are measured through an Ubbelohde viscometer, the aim then being to determine the viscosity difference between a polymer solution and its solvent, in this case m-cresol (1% solution). Standards that can be used are DIN 51562; DIN ISO 1628 or corresponding standards.

The blends to be used in one preferred embodiment preferably comprise, as component (1), nylon-6, nylon-6,6, nylon-4,6, nylon-12 or copolyamides. In an embodiment to which alternative preference is given the blends comprise at least one of the polyamides mentioned and at least one other thermoplastic polymer from the group of polyphenylene oxide, polyethylene or polypropylene.

The polyamides to be used with preference in the thermoplastic moulding compositions according to the invention can be produced by various processes and synthesized from various units. There are very many known procedures for the production of polyamides, and as a function of desired final product these use different monomer units, various chain regulators for adjustment to a desired molecular weight, or else monomers having reactive groups for post-treatments to be carried out subsequently.

The industrially relevant processes for the production of the polyamides preferred according to the invention mostly proceed by way of polycondensation in the melt. For the purposes of the present invention, the hydrolytic polymerization of lactams is also considered to be polycondensation.

Polyamides preferred according to the invention are semicrystalline polyamides which are produced by starting from diamines and dicarboxylic acids and/or lactams having at least 5 ring members, or from corresponding amino acids. Preferred starting materials that can be used are aliphatic and/or aromatic dicarboxylic acids, particularly adipic acid, 2,2,4-trimethyladipic acid, 2,4,4-trimethyladipic acid, azelaic acid, sebacic acid, isophthalic acid, terephthalic acid, aliphatic and/or aromatic diamines, particularly tetramethylenediamine, hexamethylenediamine, 2-methylpentane-1,5-diamine, 1,9-nonandiamine, 2,2,4- and 2,4,4-trimethylhexamethylenediamine, the isomers of diaminodicyclohexylmethane, diaminodicyclohexylpropane, bisaminomethylcyclohexane, phenylenediamine, xylylenediamine, aminocarboxylic acids, in particular amino caproic acid, or the corresponding lactams. Copolyamides of a plurality of the monomers mentioned are included.

Particularly preferred polyamides according to the invention are produced from caprolactam, very particularly preferably from ε-caprolactam.

Particular preference is moreover more particularly given to most of the compounded materials that are based on PA6 and on PA66, and to other compounded materials that are based on aliphatic or/and aromatic polyamides and, respectively, copolyamides, and that have from 3 to 11 methylene groups for each polyamide group in the polymer chain.

Iron oxalate is used as component (2).

Oxalate here is the thermally activatable reducing anion which at temperatures of from 100 to 450° C., preferably from 150 to 400° C., particularly preferably from 200 to 400° C., undergoes reactions at an adequate reaction rate with a standard potential, at 25° C. relative to the standard hydrogen electrode, of less than 0 V, preferably less than −0.15 V, particularly preferably less than −0.3 V. For the purposes of this invention, adequate reaction rates are considered to be reaction rates which lead to at least 10 mol %, preferably at least 25 mol %, particularly preferably at least 50 mol %, conversion of the substance used, in this case the thermally activatable reducing anion, over a period of one hour.

More particularly, very particular preference is given to iron(II) oxalate dihydrate as component (2).

Component (2) to be used according to the invention is preferably used in the form of powder, paste or compactate. Preferred powders of component (2) have an average particle size $d_{50}$ of at most 1000 μm, preferably from 0.1 to 500 μm, particularly preferably from 0.5 to 250 μm (in accordance with ASTM D1921-89, Procedure A), thus ensuring fine dispersion within the thermoplastic. If component (2) is used in the form of paste or compactate, the binders usually used for the production of pastes or compactates, preferably waxes, oils, polyglycols or similar compounds, can be used, optionally also in combinations, in suitable quantitative proportions.

As further ingredients of component (3) it is preferable to use at least one substance of the group of thermal stabilizers different from component (2), UV stabilizers, gamma-radiation stabilizers, hydrolysis stabilizers, antistatic agents, emulsifiers, nucleating agent, plasticizers, processing aids, impact modifiers, lubricants, mould-release agents, dyes or pigments. The additives mentioned, and other suitable additives, are prior art and can be found by the person skilled in the art by way of example in Plastics Additives Handbook, 5th Edition, Hanser-Verlag, Munich, 2001, pages 80-84, 546-547, 688, 872-874, 938, 966. The ingredients to be used as component (3) can be used alone or in a mixture, or in the form of masterbatches.

According to the invention, preferred additional thermal stabilizers which are to be used as additive and which differ from component (2) are copper compounds, in particular copper halides in combination with alkali metal halides, or are alkali metal halides and alkaline earth metal halides, preferably sodium chloride and calcium chloride, manganese chloride, sterically hindered phenols and/or phosphites, phosphates, preferably disodium dihydrogendiphosphate, hydroquinones, aromatic secondary amines, in particular diphenylamines, substituted resorcinols, salicylates, benzotriazoles or benzophenones, and also variously substituted members of these groups and/or mixtures thereof. It is particularly preferable to use, as thermal stabilizer, potassium bromide and/or copper(I) iodide, and it is very particularly preferable to use potassium bromide and copper(I) iodide.

According to the invention, preferred UV stabilizers to be used as additive are substituted resorcinols, salicylates, benzotriazoles or benzophenones.

According to the invention, if preferred impact modifiers or elastomer modifiers are to be used as component (3) they very generally involve copolymers preferably composed of at least two of the following group of monomers: ethylene, propylene, butadiene, isobutene, isoprene, chloroprene, vinyl acetate, styrene, acrylonitrile and acrylate or methacrylate having from 1 to 18 carbon atoms in the alcohol component. The copolymers can comprise compatibilizing groups, preferably maleic anhydride or epoxide.

According to the invention, preferred dyes or pigments to be used as additive are inorganic pigments, particularly titanium dioxide, ultramarine blue, iron oxide, zinc sulphide or carbon black, or else organic pigments, particularly preferably phthalocyanines, quinacridones, perylenes, and also dyes, particularly nigrosine or anthraquinones as colourants, or else other colorants.

According to the invention, preferred nucleating agents to be used as additive are sodium phenylphosphinate or calcium phenylphosphinate, aluminium oxide or silicon dioxide or talc powder, particularly talc powder.

According to the invention, preferred lubricants and/or mould-release agents to be used as additive are long-chain fatty acids, in particular stearic acid, salts thereof, in particular Ca stearate or Zn stearate, or else the ester or amide derivatives of these, in particular ethylenebisstearylamide, glycerol tristearate, stearyl stearate, montan waxes, in particular esters of montanic acids with ethylene glycol, or else oxidized and non-oxidized forms of low-molecular-weight polyethylene waxes and of low-molecular-weight polypropylene waxes. According to the invention, particularly preferred lubricants and/or mould-release agents are those in the group of the esters or amides of saturated or unsaturated aliphatic carboxylic acids having from 8 to 40 carbon atoms with saturated aliphatic alcohols or amines having from 2 to 40 carbon atoms. In another preferred embodiment, these moulding compositions according to the invention comprise mixtures of the abovementioned lubricants and/or mould-release agents.

For the purposes of the present invention, fillers and reinforcing materials as component (4) are fibrous, acicular or particulate fillers and fibres, acicular or particulate reinforcing materials. Preference is given to carbon fibres, glass beads, amorphous silica, calcium silicate, calcium metasilicate, magnesium carbonate, kaolin, calcined kaolin, chalk, powdered quartz, mica, phlogopite, barium sulphate, feldspar, wollastonite, montmorillonite or glass fibres, particularly glass fibres, in particular glass fibres made of E glass. In one preferred embodiment, in order to improve compatibility with thermoplastics, the fibres or the particulate reinforcing materials have been provided with suitable surface modifications, in particular surface modifications comprising silane compounds.

The present invention further provides a process for the production of the thermoplastic moulding compositions according to the invention, characterized in that components (1) to (3), and also optionally (4), are mixed in appropriate proportions by weight. The mixing of components preferably takes place at temperatures from 220 to 400° C., by combining, mixing, kneading, compounding, extruding, or rolling the components together, with particular preference via compounding in a co-rotating twin-screw extruder or Buss kneader. It can be advantageous to premix individual components.

In one preferred embodiment, the moulding compositions according to the invention are produced in a two-stage process. In the first step, component (2) is mixed with a thermoplastic polymer to give a premix, and heated to a temperature above the reaction temperature of component (2). It is also possible that other components of the thermoplastic moulding composition according to the invention are mixed in this step with component (2) and with a thermoplastic polymer. This step is preferably carried out in a co-rotating twin-screw extruder, Buss kneader or planetary-roll extruder.

It is preferable that component (2) is reacted in this first step in a polyamide, preferably PA6 or PA66, with a relative solution viscosity in m-cresol of from 2.8 to 5.0, preferably from 3.5 to 4.5.

It is preferable that, in this first step, the premix made of thermoplastic polymer and component (2), and also optionally other components is heated to a temperature of from 300 to 400° C., particularly from 320 to 390° C., very particularly from 330 to 380° C.

In one preferred embodiment, the premix in the first step comprises not only the thermoplastic and components (2) but also at least one processing stabilizer. Preferred processing stabilizer used comprises sterically hindered phenols and/or phosphites, phosphates, hydroquinones, aromatic secondary amines, in particular diphenylamines, substituted resorcinols, salicylates, benzotriazoles or benzophenones, or else variously substituted members of these groups and/or mixtures thereof.

The proportion of component (2) in the premix in the first step is preferably from 1 to 60% by weight, particularly preferably from 1 to 30% by weight, very particularly preferably from 2 to 20% by weight.

The premix is preferably reacted in a twin-screw extruder, Buss kneader or planetary-roll extruder equipped with a devolatilizing function, in order to relief gaseous components arising during the reaction of component (2).

As an alternative, component (2) can be reacted in a suitable substance of components (3) in a twin-screw extruder, Buss kneader or other apparatus suitable for heating the mixture to temperatures above the reaction temperature of component (2). A batch process can also be used in the first step, preferably in a stirred autoclave.

In an alternative preferred embodiment, component (2) is used in combination with one or more compounds which increase the reaction rate of component (2). The reaction of component (2) is thus possible at lower temperatures. Compounds of this type, are also termed activators, are described by way of example in U.S. Pat No. 4,438,223, the entire content of which is concomitantly comprised by the present invention. It is preferable to use, as activator, at least one compound from the group of sodium hydrogencarbonate or potassium hydrogencarbonate, sodium acetate or potassium acetate, sodium carbonate or potassium carbonate, sodium chloride or potassium chloride, sodium bromide or potassium bromide, sodium iodide or potassium iodide, sodium rhodanide or potassium rhodanide or sodium benzoate or potassium benzoate.

In the second step, the premix from the first step is mixed with the remaining components of the thermoplastic moulding composition according to the invention by the processes described above.

The thermoplastic moulding compositions to be produced according to the invention can be processed by processes known to the person skilled in the art, in particular via injection moulding, extrusion or blow moulding.

It can be advantageous to produce mouldings or semifinished products directly from a physical mixture produced at room temperature, preferably from 0 to 40° C., this being know as a dry blend, of premixed components and/or of individual components.

The mouldings to be produced according to the invention from the moulding compositions can preferably be used in the motor vehicle industry, electrical industry, electronics industry, telecommunications industry, solar industry, information technology industry, or computer industry, in the household, in sports, in medicine or in the consumer electronics industry. More particularly, moulding compositions according to the invention can be used for applications requiring high stability with respect to heat-ageing. For applications of this type, preference is given to the use for mouldings in vehicles, in particular in motor vehicles, more particularly in the engine compartment of motor vehicles. The present invention therefore also provides the use of thermoplastic moulding compositions comprising the stabilizer system to be used according to the invention for the production of mouldings and items with increased stability with respect to adverse thermooxidative effects and/or adverse photooxidative effects, preferably of mouldings for motor vehicles, more particularly preferably for the engine compartment of motor vehicles. The thermoplastic moulding composition according to the invention are moreover also suitable for applications or moulding compositions or items where stability with respect to adverse photooxidative effects is required in addition to thermooxidative stability, preferably solar installations.

The invention further provides the use of the fibres, foils or mouldings to be produced according to the invention for the production of items for the electrical industry, electronics industry, telecommunications industry, information technology industry, solar industry, or computer industry, for the household, for sports, for medical applications or for the consumer electronic industry, particularly preferably for motor vehicles, very particularly preferably for the engine compartment of motor vehicles.

EXAMPLES

In order to demonstrate the advantages of the moulding compositions according to the invention, a premix was first produced with 5% of iron oxalate, and the thermoplastic moulding compositions were then produced. Data in [%] are always percent by weight.
Production of a Premix With 5% of Iron Oxalate 5% by weight of iron oxalate were mixed with 95% by weight of a PA6 A polyamide in a ZSK 26 Compounder twin-screw extruder from Coperion Werner & Pfleiderer (Stuttgart, Germany) at a temperature of about 370° C., discharged in the form of strand into a water bath, cooled until pelletizable and pelletized. The pellets were dried for two days at 70° C. in a vacuum drying oven.
Production of the Thermoplastic Moulding Composition The individual components were mixed in a ZSK 26 Compounder twin-screw extruder from Coperion Werner & Pfleiderer (Stuttgart, Germany) at a temperature of about 280° C., discharged in the form of strand into a water bath, cooled until pelletizable and pelletized. The pellets were dried for two days at 70° C. in a vacuum drying oven.

TABLE 1

Compositions of the moulding compositions (all data in % by weight).

| Ingredient | Comparative Example 1 | Inventive Example 1 |
|---|---|---|
| Glass fibre | 30.000 | 30.000 |
| PA6 B | 69.680 | 59.820 |
| Microtalc powder | 0.020 | 0.020 |
| Montan ester wax | 0.160 | 0.160 |
| Potassium bromide | 0.100 | |
| Copper(I) iodide | 0.040 | |
| Premix of 5% of iron oxalate in PA6 A | | 10.000 |

Materials used:
PA6 A: Nylon-6, linear with a relative solution viscosity of 4.0 for a 1% solution in m-cresol
PA6 B: Nylon-6, linear with a relative solution viscosity of 2.9 for a 1% solution in m-cresol
Montan ester wax, e.g. Licowax® E from Clariant GmbH
Glass fibres, e.g. CS7928 from Lanxess Deutschland GmbH
Potassium bromide, $d_{99}<70$ μm
Copper(I) iodide, $d_{99}<70$ μm
Iron oxalate, for example iron(II) oxalate dihydrate from VWR International GmbH

What is claimed is:

1. A non-chlorinated, ployamide composition having improved stabilization against thermooxidative and/or photooxidative degradation, the composition consisting of:
   (1) 10 to 99.85% by weight of non-chlorinated polymer,
   (2) 0.05 to 10% by weight of iron oxalate, and
   (3) 0.1 to 70% by weight of other non-chlorine containing ingredients,
wherein the total of all of the percentages by weight is always 100% by weight, and the non-chlorinated polymer is at least one aliphatic polyamide, or a blend of at least one aliphatic polyamide and a polyalkylene.

2. The composition according to claim 1, wherein the iron oxalate is iron(II) oxalate dihydrate.

3. The composition according to claim 2, wherein the non-chlorinated polymer is a semicrystalline polyamide, and the aliphatic polyamide is a polyamide produced from one or more of the monomers selected from the group consisting of: adipic acid, 2,2,4-trimethyladipic acid, 2,2,4-trimethyladipic acid, azelaic acid, sebacic acid, tetramethylenediamine, hexamethylenediamine, 2-methylpentane-1,5-diamine, 1,9-nonandiamine, 2,2,4- and 2,4,4-trimethylhexamethylenediamine, the isomers of diaminodicyclohexylmethane, diaminodicyclohexylpropane, bisaminomethylcyclohexane, and ϵ-caprolactam.

4. The composition according to claim 2, wherein the non-chlorinated polymer is an aliphatic polyamide produced from one or more of the monomers selected from the group consisting of: ϵ-caprolactam, adipic acid, hexamethylenediamine, tetramethylenediamine, or 2-methylpentane-1,5-diamine.

5. The composition according to claim 3, wherein the other non-chlorine containing ingredients include at least one non-chlorine containing additive selected from the group consisting of heat stabilizers different from component (2), UV stabilizers, gamma-radiation stabilizers, hydrolysis stabilizers, antistatic agents, emulsifiers, nucleating agents, plasticizers, processing aids, impact modifiers, lubricants, mould-release agents, dyes, and pigments.

6. A method for stabilizing non-chlorinated, polyamide compositions with respect to adverse thermal oxidative and/or photooxidative effects, the method comprising:
   mixing an effective amount of iron oxalate with:
      non-chlorinated aliphatic polyamide, or
      a blend of non-chlorinated aliphatic polyamide and non-chlorinated polyalkylene; and
   heating the mixture to a temperature above the reaction temperature of the iron oxalate.

7. Thermoplastic fibres, foils or mouldings, obtained via injection moulding, extrusion or blow moulding of the non-chlorinated, polyamide composition according to claim 1.

8. A process for the production of the non-chlorinated, polyamide compositions according to claim 1, the process comprising mixing the non-chlorinated polymer, the iron oxalate and the other ingredients in appropriate parts by weight at a temperature above the reaction temperature of the iron oxalate and sufficient to melt the polymer.

9. The process according to claim 8, wherein the mixing comprises:
   premixing the iron oxalate with the non-chlorinated polymer to form a premix,
   heating the premix to 220 to 400° C., and
   mixing the premix with the other ingredients of the non-chlorinated, polyamide composition.

10. The composition according to claim 1, wherein the non-chlorinated polymer is at least one of PA6, PA66, PA46, PA12, and copolyamides thereof.

11. The composition according to claim 1, wherein:
   the non-chlorinated polymer is PA6, PA66 or a copolyamide of PA6 or PA66;
   the iron oxalate is iron(II) oxalate dihydrate; and
   the other ingredients include at least one non-chlorine containing additive selected from the group consisting of heat stabilizers different from component (2), UV stabilizers, gamma-radiation stabilizers, hydrolysis stabilizers, antistatic agents, emulsifiers, nucleating agents, plasticizers, processing aids, impact modifiers, lubricants, mould-release agents, dyes, and pigments.

* * * * *